US011216168B2

(12) United States Patent
Sarang et al.

(10) Patent No.: US 11,216,168 B2
(45) Date of Patent: Jan. 4, 2022

(54) SYSTEMS AND METHODS FOR BUILDING ENTERPRISE MANAGEMENT

(71) Applicant: Johnson Controls Tyco IP Holdings LLP, Milwaukee, WI (US)

(72) Inventors: Ashish Sarang, Thane (IN); Lawrence Dsouza, East Mumbai (IN); Sourabh Taranath Joshi, Thane (IN); Mukul Vashisth, Pune (IN); Braja Majumdar, Hooghly (IN); Barkha Shah, Mumbai (IN); Abhigyan Chatterjee, Asansol (IN); Kaustubh S. Patil, Pune (IN); Vipul Devre, Kalyan West (IN); Terrill Laughton, Lake Forest, IL (US); Manohar Kulkarni, Pune (IN); Michael Bonfiglio, Sussex, WI (US); Ansari Haider Ali, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 72 days.

(21) Appl. No.: 16/155,569

(22) Filed: Oct. 9, 2018

(65) Prior Publication Data
US 2020/0110531 A1 Apr. 9, 2020

(51) Int. Cl.
*G06F 3/0484* (2013.01)
*G05B 15/02* (2006.01)
(Continued)

(52) U.S. Cl.
CPC ......... *G06F 3/04847* (2013.01); *G05B 15/02* (2013.01); *G06F 3/0482* (2013.01); *G06F 3/0483* (2013.01); *G06F 3/04845* (2013.01)

(58) Field of Classification Search
CPC .............. G06F 11/3476; G06F 16/168; G06F 2201/86; G06F 3/04842; G06F 3/0447;
(Continued)

(56) References Cited

U.S. PATENT DOCUMENTS

| 5,228,119 A * | 7/1993 | Mihalisin | G09G 5/00 345/418 |
| 7,242,403 B2 * | 7/2007 | Phelan | G06F 3/04847 345/440 |

(Continued)

FOREIGN PATENT DOCUMENTS

WO WO-2010/129913 A1 11/2010

OTHER PUBLICATIONS

International Search Report for Application No. PCT/US2019/055324, dated Jan. 8, 2020, 14 pages.

*Primary Examiner* — Wilson W Tsui
(74) *Attorney, Agent, or Firm* — Foley & Lardner LLP

(57) ABSTRACT

A method includes generating, by a processing circuit, a building component tree for the graphical user interface, wherein the building component tree comprises one or more draggable building components and one or more non-draggable building components and causing, by the processing circuit, the graphical user interface to include the building component tree comprising the draggable building components and the non-draggable building components. The method includes receiving, by the processing circuit via the graphical user interface, a selection of one of the one or more draggable building components and a user interaction dragging the one of the one or more draggable building components into a window of the graphical user interface.

19 Claims, 11 Drawing Sheets

(51) Int. Cl.
*G06F 3/0482* (2013.01)
*G06F 3/0483* (2013.01)

(58) Field of Classification Search
CPC .. G06F 9/4451; G06F 3/04847; G06F 3/0482; G06F 3/0483; G06F 3/04845; G05B 15/02; G05B 13/00; G05B 19/048
See application file for complete search history.

(56) References Cited

U.S. PATENT DOCUMENTS

| | | | | |
|---|---|---|---|---|
| 7,577,995 B2* | 8/2009 | Chebolu | ............... | H04L 63/102 726/2 |
| 8,078,953 B2* | 12/2011 | Kunz | ............... | G06F 40/111 715/209 |
| 8,078,986 B1* | 12/2011 | Rhyne | ............... | G06Q 20/102 715/789 |
| 9,032,328 B1* | 5/2015 | Kilat | ............... | G06F 8/315 715/789 |
| 10,114,964 B2* | 10/2018 | Ramesh | ............... | G06F 21/6218 |
| 2003/0229607 A1* | 12/2003 | Zellweger | ............... | G06F 40/183 |
| 2006/0253214 A1* | 11/2006 | Gross | ............... | G06Q 30/0601 700/97 |
| 2007/0016441 A1* | 1/2007 | Stroup | ............... | G06Q 10/10 705/2 |
| 2007/0043846 A1* | 2/2007 | Grayson | ............... | H04L 51/22 709/223 |
| 2008/0077945 A1* | 3/2008 | Sethuraman | ............... | G06F 9/451 719/329 |
| 2009/0094007 A1* | 4/2009 | Konno | ............... | G06Q 10/00 703/6 |
| 2010/0318200 A1* | 12/2010 | Foslien | ............... | G06Q 10/06 700/83 |
| 2011/0185283 A1* | 7/2011 | Jun | ............... | H04M 1/72572 715/745 |
| 2013/0042197 A1* | 2/2013 | Amare | ............... | G09B 23/02 |
| 2015/0106736 A1* | 4/2015 | Torman | ............... | G06F 21/629 715/745 |
| 2016/0103891 A1 | 4/2016 | Choudhary et al. | | |
| 2017/0212668 A1* | 7/2017 | Shah | ............... | G05B 19/048 |

* cited by examiner

SYSTEMS AND METHODS FOR BUILDING ENTERPRISE MANAGEMENT

BACKGROUND

The present disclosure relates generally to building and enterprise management systems for tracking and displaying key performance indicators.

With the advent of advanced building management systems today, it is becoming increasingly viable to monitor a multitude of components within a building to control energy usage and to monitor various usage statistics for the building. Particularly, an energy management system is a type of building management system that focuses on the energy distribution of a building. The energy management system can be a collection of computer-based tools designed to monitor and render information corresponding to energy usage. For a user to monitor and control the system, a user interface is configured to present data on the different elements of system.

SUMMARY

One implementation of the present disclosure is a method of managing a graphical user interface. The method includes providing, on a user interface to a user, a list of sources and corresponding points for the sources which provide a value for a variable for calculating a key performance indicator (KPI). The method includes receiving, from the user, a selection of a first point from a first data source. The method includes receiving, from the user, a selection of a second point from a second data source different from the first data source. The method includes receiving, from the user, a relationship between the first point and the second point for defining the KPI. The method includes creating the KPI having an equation which is defined by the relationship. The method includes receiving, from the first point and the second point a first data sample from the first point and a second data sample from the second point. The method includes calculating, using the first data sample and the second data sample, the KPI using the equation. The method includes rendering the calculated KPI within a widget of the user interface.

In some embodiments, the first data source includes an online building management system and the second data source includes an offline data source.

In some embodiments, the offline data source comprises one of an offline data source manually updated by a user or an offline data source integrated with an enterprise resource planning system.

In some embodiments, rendering the calculated KPI within a widget of a user interface includes identifying, based on the KPI and an administrator defined settings, a department associated with the KPI, and rendering the calculated KPI within the widget of the user interface, the user interface being included in a tab associated with a dashboard specific to the department associated with the KPI.

In some embodiments, the method further includes receiving, from a user associated with the department, a modification of the dashboard including at least one of renaming the tab, rearranging a location of the tab within the dashboard, or rearranging a location of the widget within the user interface for the tab. In these embodiments, the method further includes modifying the dashboard in accordance with the received modification from the user.

In some embodiments, the method further includes authenticating the user as being associated with the department prior to displaying the dashboard to the user.

In some embodiments, the dashboard includes a navigation pane including a plurality of nested tabs including a primary tab and a plurality of secondary tabs, each tab within the nest having a hierarchy. The method may further include receiving, from the user viewing the dashboard, a selection of the primary tab within the navigation pane. The method may further include expanding a list nested within the primary tab, the list including the plurality of secondary tabs. The method may further include modifying the navigation pane in accordance with the plurality of secondary tabs contained in the list.

In some embodiments, modifying the navigation pane comprises at least one of modifying a width of the navigation pane based on a length of text for at least one of the plurality of secondary tabs, or modifying a viewing region of the navigation pane based on a number of the plurality of secondary tabs contained in the list.

In some embodiments, the plurality of nested tabs include the primary tab, which is associated with a location of an enterprise, the plurality of secondary tabs nested within the primary tab, which are associated with buildings at the location, a plurality of tertiary tabs nested within one of the plurality of secondary tabs, which are associated with levels of a building, a plurality of quaternary tabs nested within one of the plurality of tertiary tabs, which are associated with zones within a level, and a plurality of quinary tabs nested within one of the quaternary tabs, which are associated with rooms within a zone.

In some embodiments, rendering the calculated KPI within the widget of the user interface includes rendering the calculated KPI within the widget of the user interface of a kiosk, the kiosk having a customizable user interface.

Another implementation of the present disclosure includes a system of managing a graphical user interface. The system includes a plurality of data sources having corresponding points which provide a value for a variable for calculating a key performance indicator (KPI). The plurality of data sources includes a first data source and a second data source. The system includes a display configured to render a user interface to a user. The system includes a controller communicably coupled to the first data source, the second data source, and the display. The controller is configured to provide, on the user interface to the user, a list of sources and corresponding points for the sources which provide a value for a variable for calculating a key performance indicator (KPI). The controller is configured to receive, from the user, a selection of a first point from a first data source. The controller is configured to receive, from the user, a selection of a second point from a second data source different from the first data source. The controller is configured to receive, from the user, a relationship between the first point and the second point for defining the KPI. The controller is configured to create a KPI having an equation which is defined by data from the first data source and the second data source. The controller is configured to receive, from the first point and the second point, a first data sample from the first point and a second data sample from the second point. The controller is configured to calculate, using the first data sample and the second data sample, the KPI using the equation. The controller is configured to render, on the display, the calculated KPI within a widget of the user interface.

In some embodiments, the first data source comprises an online building management system and the second data source comprises an offline data source.

In some embodiments, the offline data source comprises one of an offline data source manually updated by a user or an offline data source integrated with an enterprise resource planning system.

In some embodiments, render the calculated KPI within a widget of a user interface includes identify, based on the KPI and an administrator defined settings, a department associated with the KPI, and render the calculated KPI within the widget of the user interface, the user interface being included in a tab associated with a dashboard specific to the department associated with the KPI.

In some embodiments, the controller is further configured to authenticate a user as being associated with the department prior to displaying the dashboard to the user. The controller is further configured to receive, from the authenticated user, a modification of the dashboard including at least one of renaming the tab, rearranging a location of the tab within the dashboard, or rearranging a location of the widget within the user interface for the tab. The controller is further configured to modify the dashboard in accordance with the received modification from the authenticated user.

In some embodiments, the dashboard includes a navigation pane including a plurality of nested tabs including a primary tab and a plurality of secondary tabs, each tab within the nest having a hierarchy. The controller is further configured to receive, from the user viewing the dashboard, a selection of the primary tab within the navigation pane. The controller is further configured to expand a list nested within the primary tab, the list including the plurality of secondary tabs. The controller is further configured to modify the navigation pane in accordance with the plurality of secondary tabs contained in the list.

In some embodiments, modify the navigation pane includes at least one of modify a width of the navigation pane based on a length of text for at least one of the plurality of secondary tabs, or modify a viewing region of the navigation pane based on a number of the plurality of secondary tabs contained in the list.

In some embodiments, the plurality of nested tabs includes the primary tab, which is associated with a location of an enterprise, the plurality of secondary tabs nested within the primary tab, which are associated with buildings at the location, a plurality of tertiary tabs nested within one of the plurality of secondary tabs, which are associated with levels of a building, a plurality of quaternary tabs nested within one of the plurality of tertiary tabs, which are associated with zones within a level, and a plurality of quinary tabs nested within one of the quaternary tabs, which are associated with rooms within a zone.

In some embodiments, the system further includes a kiosk associated with an enterprise. The kiosk has a customizable user interface according to requirements of the enterprise. Render the calculated KPI within the widget of the user interface may further include render the calculated KPI within the widget of the user interface of the kiosk.

Another implementation of the present disclosure includes a controller for managing a graphical user interface. The controller is configured to execute instructions. The instructions include provide, on a user interface to a user, a list of sources and corresponding points for the sources which provide a value for a variable for calculating a key performance indicator (KPI). The instructions include receive, from the user, a selection of a first point from a first data source. The instructions include receive, from the user, a selection of a second point from a second data source different from the first data source. The instructions include receive, from the user, a relationship between the first point and the second point for defining the KPI. The instructions include create a KPI having an equation which is defined by data from the first data source and the second data source. The instructions include receive, from the first point and the second point, a first data sample from the first point and a second data sample from the second point. The instructions include calculate, using the first data sample and the second data sample, the KPI using the equation. The instructions include render, on the display, the calculated KPI within a widget of the user interface.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
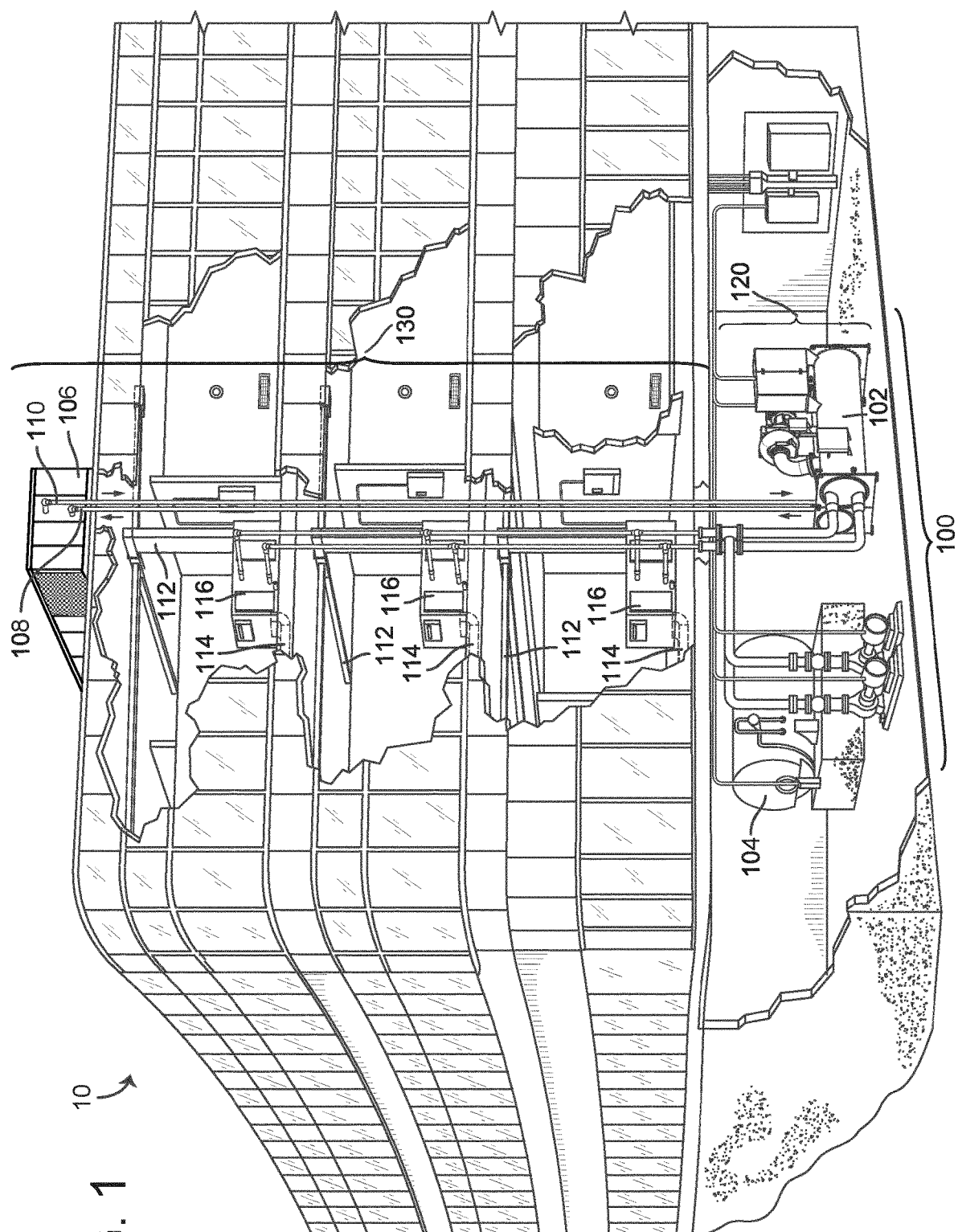
FIG. 1 is a schematic drawing of a building equipped with a HVAC system, according to an exemplary embodiment.

Referring generally to the FIGURES, systems and methods for managing a user interface which provides information pertaining to an enterprise is shown, according to various exemplary embodiments. Many building enterprise management solutions (BEMS) monitor facilities and buildings within a portfolio and their performance using various key performance indicators (KPIs). Some KPIs may be more or less valuable according to different audiences and different types of businesses. For instance, enterprises having manufacturing facilities may need or desire monitoring of measuring critical manufacturing processes are running within acceptable limits.

An enterprise who is monitoring, for instance, their manufacturing processes may be provided a fixed list of KPIs which are tracked against different commodities, such as electricity, compressed air, fuel oil, heat etc., utilized within their manufacturing plants across different locations. Such KPIs may be displayed on a fixed dashboard (e.g., widgets for the dashboard) in such a manner that different user groups can infer specific performance information from the KPIs. For instance, an engineering team may view KPIs related to commodity use for production like electricity per ton of product/batch, or fuel oil per ton of product/batch, whereas a finance team may view KPIs related to financial information like cost per ton of product/batch. Each KPI (or a subset of KPIs or a summary of the performance based on the KPIs) may be submitted to higher management, department heads or leaders, etc. for various audits of the manufacturing operations so that efficiency can be monitored, and necessary actions or decisions can be taken.

In typical BEMS, KPIs were static on a dashboard which had fixed widgets displaying information to all the same users, regardless of which department a specific user is in. Custom widgets are unavailable, and points are typically not editable according to enterprise requirements. Due to these limitations, only specific KPIs (which are predefined or built-in as part of a BEMS application) were visible and, as such, gave limited information on energy and equipment management and performance.

According to the aspects described herein, custom tabs may be generated along with custom KPIs. Custom tabs may be made available to particular users in, for instance, particular departments or within a department-specific dashboard as described in greater detail below with reference to section (B). Custom KPIs may be mapped to adhoc widgets, and may be demonstrated on specific dashboards. The custom KPIs may fetch, retrieve, receive, etc. data from different sources, such as online and offline sources which capture data, and are used for creating a virtual point. A KPI equation may be defined under the virtual point.

A user, such as an administrator, manager, etc. may combine multiple raw data points under one virtual point to form an equation or calculation of a custom KPI. The user may then tag the custom KPI to a specific dashboard (e.g., such that the custom KPI is available to particular users in various departments, for instance).

Building Management System and HVAC System

Figure 2:
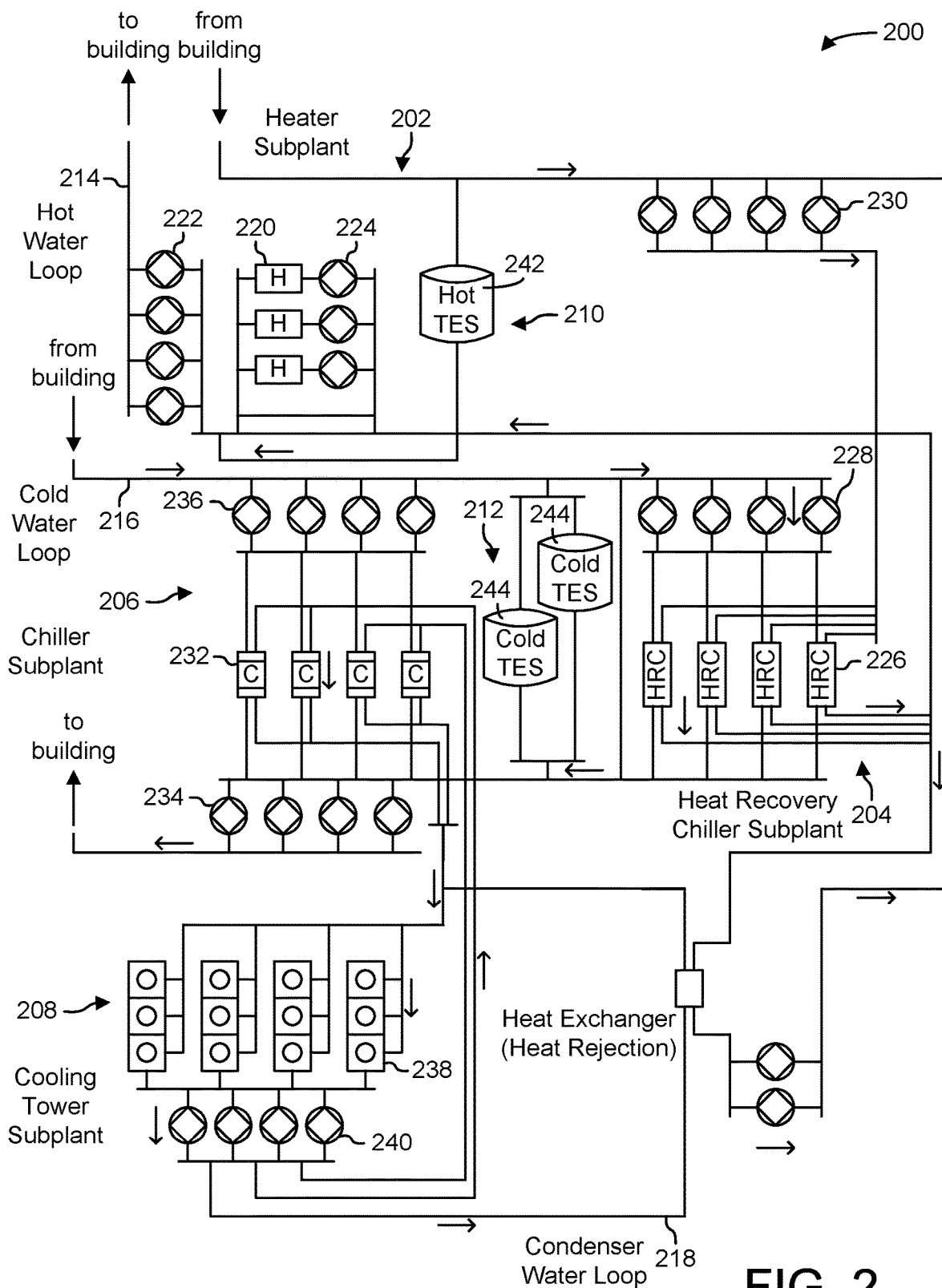
FIG. 2 is a schematic block diagram of a waterside system that may be used in conjunction with the building of FIG. 1, according to an exemplary embodiment.
Figure 3:
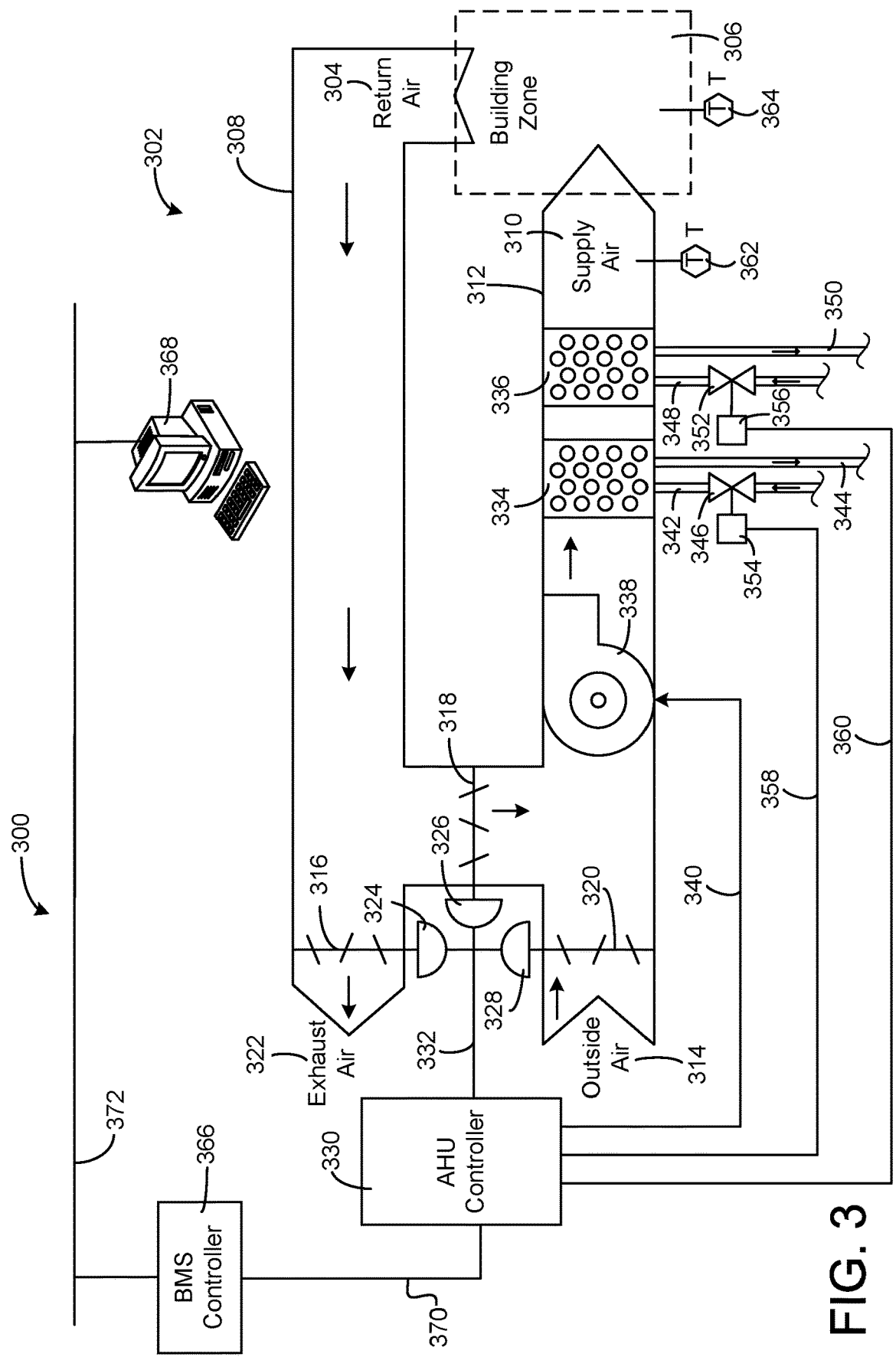
FIG. 3 is a schematic block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, set-points, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
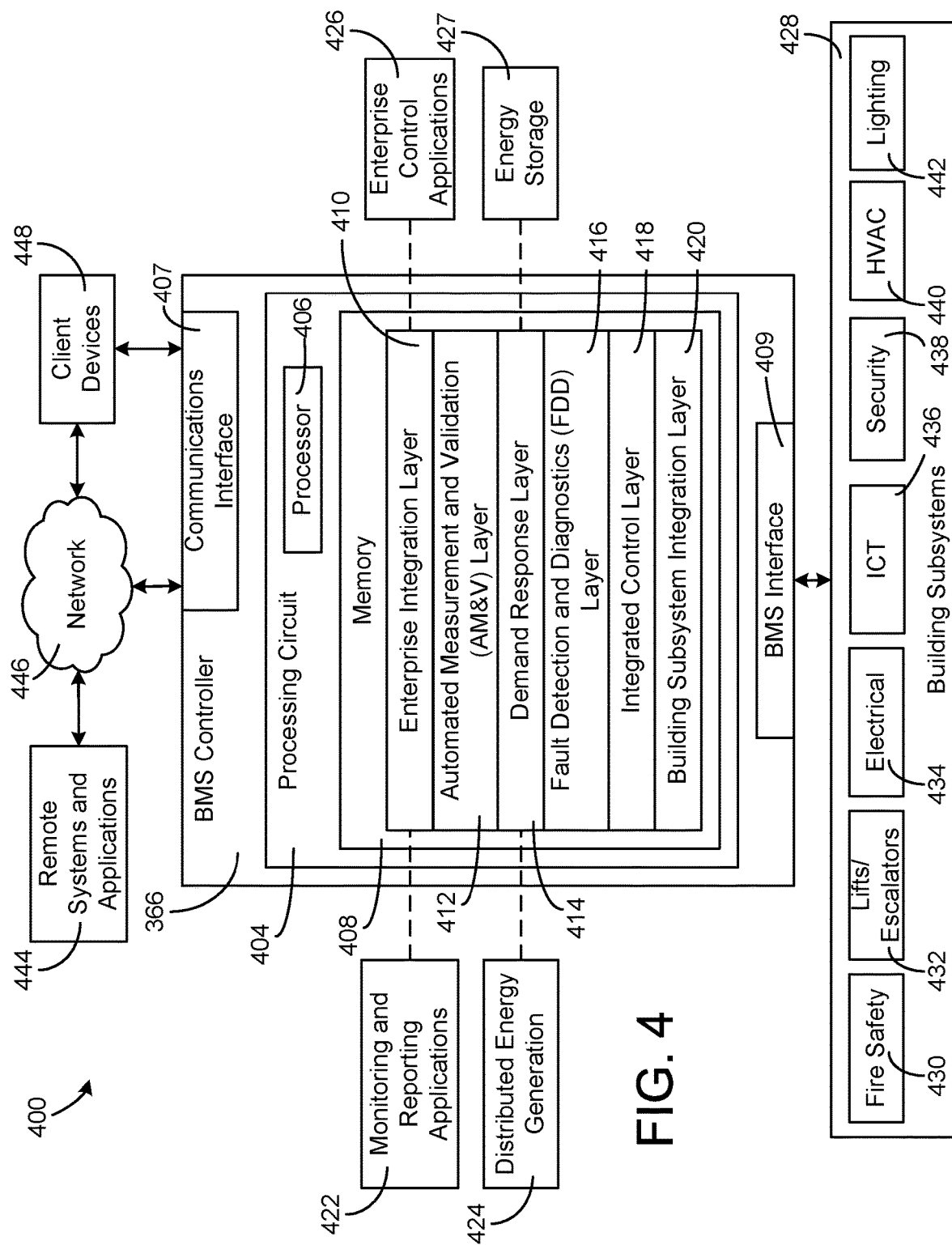
FIG. 4 is a schematic block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Graphical User Interface Management System and Methods

The section describing the graphical user interface management system and methods will be divided into several sections describing different aspects of the overall system and methods. While some features described in one section may be carried over to other section(s), it is noted that the present disclosure is not limited to the particular arrangements described herein. Rather, various modifications may be made to the disclosed systems and methods, some embodiments described in one section may be included in other section(s), and some embodiments may be omitted. The following sections will be included:

A. Systems and Methods for Generating a Key Performance Indicator

B. Systems and Methods for Generating Custom Dashboards

C. Systems and Methods for Modifying a Navigation Pane

D. A Configurable Kiosk for Rendering a User Interface

Figure 5:
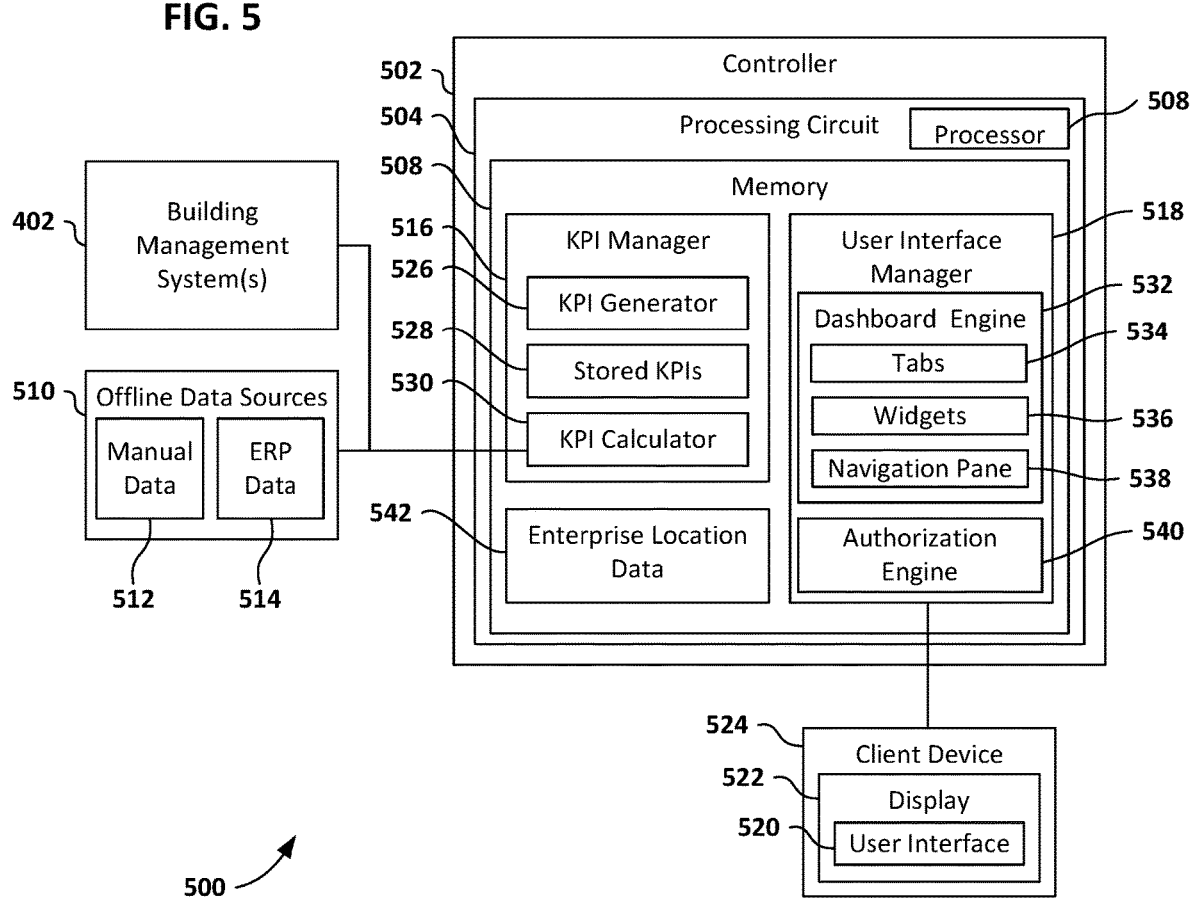
FIG. 5 is a system for managing a user interface, according to an exemplary embodiment.

Referring now to FIG. 5, a system 500 for managing a graphical user interface is shown, according to an exemplary embodiment. The system 500 may be used for managing or identifying performance and resource usage of various buildings (e.g., building 10 as described above with reference to FIG. 1). The system 500 may be implemented in the BMS controller 366, the remote systems and applications 444, and/or the client devices 448 of FIG. 4. The system 500 can be configured to generate a graphical user interface, as described in greater detail with further reference to FIGS. 6-12.

The system 500 is shown to include a controller 502. The controller 502 may include a processing circuit 504 having a processor 506 and memory 508. The processor 506 can be a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to an example embodiment, memory 508 is communicably connected to processor 506 via processing circuit 504 and includes computer code for executing one or more processes described herein.

The controller 502 may be communicably coupled to one or more sources of data. For instance, the controller 502 may be communicably coupled to the BMS 402 described above. Hence, the controller 502 may receive and analyze data corresponding to building equipment in the BMS 402. For instance, the controller may receive inputs from building equipment and/or building systems to manage energy for a building (e.g., thermostats, controllers, chillers, boilers, energy storage supplants, and/or any of the devices and/or systems as described with reference to FIGS. 1-4). In some embodiments, an enterprise (such as a corporation, institution, etc.) may own or operate a number of buildings at various locations. Each building may include a separate BMS 402, or a group of buildings at a particular location (e.g., a campus, for instance) may be managed by a single BMS 402. The controller 502 may be configured to receive data from the various BMS 402.

The controller 502 may be communicably coupled to one or more offline data sources 510. For instance, the offline data sources 510 may store, generate, compile, etc. manual data 512 (e.g., data manually entered by a user), enterprise resource planning (ERP) data 514, etc. While the manual data 512 and ERP data 514 is shown as being included in offline data sources 510, in some embodiments, separate communications channels or links may be used for the different types of offline data.

Each of the data sources (e.g., BMS and offline data sources 402, 510) may include a list of points corresponding to the respective source. For instance, the building management system(s) 402 may include a list of each of the components within each building for an enterprise that are configured to provide data or feedback to the controller 502. Similarly, each offline data source 510 may include a list of each cell or data field configured to provide data or feedback to the controller 502.

As will be described in greater detail below, the controller 502 may include various components (e.g., stored on memory) for analyzing data from the various sources, for generating and rendering key performance indicators, and for generating or modifying a dashboard which displays such information and data.

A. Systems and Methods for Generating a Key Performance Indicator

Many building enterprise management solutions (BEMS) monitor facilities and buildings within a portfolio and their performance using various key performance indicators (KPIs). Some KPIs may be more or less valuable according to different audiences and different types of businesses. For instance, enterprises having manufacturing facilities may monitor critical manufacturing processes to determine that such processes are running within acceptable limits.

An enterprise that is monitoring, for instance, their manufacturing processes may be provided a fixed list of KPIs which are tracked against different commodities, such as electricity, compressed air, fuel oil, heat etc., utilized within their manufacturing plants across different locations. Such KPIs may be displayed on a fixed dashboard (e.g., widgets for the dashboard) in such a manner that different user groups can infer specific performance information from the KPIs. For instance, an engineering team may view KPIs related to commodity use for production like electricity per ton of product/batch, or fuel oil per ton of product/batch, whereas a finance team may view KPIs related to financial information like cost per ton of product/batch. Each KPI (or a subset of KPIs or a summary of the performance based on the KPIs) may be submitted to higher management, department heads or leaders, etc. for various audits of the manufacturing operations so that efficiency can be monitored, and necessary actions or decisions can be taken.

In typical BEMS, KPIs were static on a dashboard which had fixed widgets displaying information to all the same users, regardless of which department a specific user is in. Custom widgets are unavailable, and points are typically not editable according to enterprise requirements. Due to these limitations, only specific KPIs (which are predefined or built-in as part of a BEMS application) were visible and, as such, gave limited information on energy and equipment management and performance.

According to the aspects described herein, custom tabs may be generated along with custom KPIs. Custom tabs may be made available to particular users in, for instance, particular departments or within a department-specific dashboard as described in greater detail below with reference to section (B). Custom KPIs may be mapped to adhoc widgets, and may be demonstrated on specific dashboards. The custom KPIs may fetch, retrieve, receive, etc. data from different sources (or points), such as online and offline sources which capture data, and are used for creating a virtual point. A KPI equation may be defined under the virtual point.

A user, such as an administrator, manager, etc. may combine multiple raw data points under one virtual point to form an equation or calculation of a custom KPI. The user may then tag the custom KPI to a specific dashboard (e.g., such that the custom KPI is available to particular users in various departments, for instance).

In brief overview, a user may create a custom KPI. Data may be captured from multiple sources, such as online BMS sources, offline sources (like an ERP system integrated with the systems described herein, manually entered data, etc.), and so forth. Such data may be captured at various intervals, such as hourly, daily, weekly, monthly, etc. Using such data, a user can create a virtual point. The virtual point may be a combination of multiple data points. The virtual point may be used for creating an equation for defining a desired KPI. As one example, a KPI for electricity per ton of production may include online meter information in form of kWh coming from BMS and production data in form of tonnage coming from ERP. The virtual point may be, for instance, (X kWh, Y tonnage). The user may define an equation, such as x/y, or kWh/tonnage, based on the virtual point. The syntax and parameters of the equation may be validated, and following validation, the virtual point and corresponding equation may be saved in a database. A background service may calculate, store, and aggregate values for the custom KPI at various frequencies (e.g., 15 min/hourly/daily/monthly/yearly, etc). The custom KPI may be rendered on a display (e.g., on a dashboard). The dashboard may be specific to various departments, buildings, etc., and may include department-specific tabs including corresponding KPIs (which may be custom KPIs in some instances). The KPIs may be included in widgets for a dashboard or user interface. A user can create a widget and add a KPI to the widget. The user may sort by commodity to filter KPIs and select the particular KPI for the widget.

Referring back to FIG. 5, and in some embodiments, the memory 508 may store or include a KPI manager 516. The KPI manager 516 may be designed or implemented to generate, store, and calculate a KPI. The KPI manager 516 may be stored, located, or otherwise included within the memory 508 of the controller 502. In some embodiments, the KPI manager 516 may be external to, but communicably coupled to and accessed by, the controller 502. The KPI manager 516 may be communicably coupled to the building management system(s) 402, the offline data sources 510, etc.

The memory 508 may further store a user interface manager 518. The user interface manager 518 may be designed or implemented to manage a user interface 520 on a display 522 for a client device 524. The user interface manager 518 may generate a new user interface 520, modify an existing user interface 520, etc. In some embodiments, the user interface manager 518 communicates various commands—such as document object model (DOM) objects—for rendering the user interface 520. The user interface manager 518 may communicate the commands to the client device 524 (e.g., across a provisioning session, remote delivery session, etc.). The client device 524 may receive the commands from the user interface manager 518, parse the commands, and render the user interface 520 on the display 522 based on the commands from the user interface manager 518.

In some embodiments, the KPI manager 516 may include a KPI generator 526. The KPI generator 526 may be designed or implemented to generate, store, or otherwise provide prompts to the user interface manager 518. The KPI generator 526 may provide prompts to the user interface manager 518 for generating a KPI. The user interface manager 518 may generate a user interface 520 based on the prompts. The user may provide an input to the user interface 520 which calls the KPI generator 526—e.g., to generate a KPI. The user interface manger 518 may be configured to request prompts for generating the KPI (e.g., from the KPI generator 526).

The KPI generator 526 may be configured to provide a prompt to the user interface manager 518 for providing a list of sources to the user. The sources may include the building management systems 402, offline data sources 510, etc., as described above. Each source may include corresponding points. The points may be or include specific components in the building management system 402, specific cells or data fields in the offline data sources 510, etc. Each point may provide a value for a variable. The variable may be used for calculating a KPI. Hence, the user may be provided a list of sources and corresponding points which provide a value for a variable of a KPI.

The user may select, from the list, a point corresponding to a source for calculating the KPI. The user may select the point on the user interface 520. The user interface manager 518 may be configured to receive the selection (e.g., of the first point from a first source). The user interface manager 518 may communicate the selection to the KPI generator 526. As one example, the user may select a first point corresponding to an ERP system. The first point may be a production output for the day for a particular building. The list may include the ERP system and may include corresponding points from the ERP system. The user may select the first point, which corresponds to the ERP system (e.g., the production output). The user interface manager 518 may receive the selection and provide the selection (or data corresponding to the selection) to the KPI generator 526.

The user may select, from the list, another point corresponding to a source for calculating the KPI. The user may select the point on the user interface 520. The user interface manager 518 may be configured to receive the selection (e.g., of the second point from a second source). In some embodiments, the first source and second source may be the same source. In some embodiments, the first source and the second source may be different sources. The user interface manager 518 may communicate the selection to the KPI generator 526. As one example, the user may select a second point corresponding to the BMS 402. The second point may be an electricity consumption for the day for a particular building. The list may include the BMS 402 and may include corresponding points from the BMS 402. The user may select the second point, which corresponds to the BMS 402 (e.g., the electricity consumption). The user interface manager 518 may receive the selection and provide the selection (or data corresponding to the selection) to the KPI generator 526.

The KPI generator 526 may thus include a selection of a first point and second point from the user. In some embodiments, the KPI generator 526 may receive selections of further points. As described in greater detail below, the user may generate (via the KPI generator 526) more nuanced, detailed equations and KPIs by adding further points and corresponding data.

The KPI generator 526 may receive a relationship between the first point and second point for defining the KPI. The KPI generator 526 may be designed or implemented to communicate a prompt to the user interface manager 518, which causes the user interface manager 518 to generate a request on the user interface 520 for a relationship between the first and second points from the user. In some embodiments, the relationship may be or include one or more operators. For instance, the operators may include a multiplication or division operator, an addition or subtraction operator, etc. The operators may be used for defining an equation for calculating the KPI. As one example, the user may request a KPI for calculating an amount of electricity used at a production plant in comparison to production values. The user may select a point corresponding to electricity usage (e.g., a point in the BMS 402) and a point corresponding to production (e.g., a point in the ERP data 514). The user may then define a relationship (e.g., electricity usage divided by production, or vice versa). When the user defines the relationship on the user interface, the user interface manager 518 may be configured to communicate the relationship provided by the user to the KPI generator 526.

The KPI generator 526 may be configured to check, verify, authenticate, or otherwise validate the relationship (e.g., the syntax) provided by the user. The KPI generator 526 may be designed or implemented to verify the syntax to determine if one or more formatting or formula changes need to be made (e.g., by the user). Where the syntax is correct, the KPI generator 526 may store the KPI (e.g., as stored KPIs 528). The stored KPIs 528 may include custom KPIs (e.g., generated as described above), standard KPIs (e.g., default KPIs which may be universally applicable to most businesses or enterprises), etc.

In some embodiments, the KPI generator 526 may store KPIs in association with particular users. Hence, the KPIs may be viewable, visible, accessible, etc. to authorized users. The stored KPIs 528 may be accessed by authorized users or groups of users, as described in greater detail below.

The KPI manager 516 may include a KPI calculator 530. The KPI calculator 530 may be designed or implemented to calculate a KPI as points provide, communicate, provision, or otherwise send data to the controller 502. Such data may be routed from the BMS 402, offline data sources 510, etc. to the KPI calculator 530. The KPI calculator 530 may update equations for KPIs in the stored KPIs 528 as data is received. The points may be configured to publish data, which may be received by the controller 502 and used for updating calculated KPIs. Each instance where a point publishes data, a data sample may be provided to the KPI calculator 530. The KPI calculator may then use the data samples for calculating the KPI. The KPI calculator 530 may use the equation (e.g., defined by the relationship between the corresponding points for the KPI) for calculating the KPI. The KPI calculator 530 may update each of the KPIs as updated data samples are provided from the points for the data sources (e.g., the BMS 402 and/or offline data sources 510).

In some embodiments, the user interface manager 518 may include a dashboard engine 532. The dashboard engine 532 may be designed or implemented to create a dashboard to present various information to targeted users. In some embodiments, the dashboard may include tabs 534, widgets 536, and a navigation pane 538. The tabs may be or include a specific page including various widgets 536. A plurality of tabs 534 (including sub-tabs, or nested tabs) may be included on the navigation pane 538. When a user selects a tab 534 (e.g., from the navigation pane 538), the user interface manager 518 may receive the selection (e.g., as a DOM event). The user interface manager 518 may update the user interface 520 based on the selection. Each tab 534 may display corresponding widgets 536 for the tab 534.

In some embodiments, a user may generate a custom tab 534. The custom tab 534 may be customized by the user based on which personnel will view the custom tab 534. The custom tab 534 may display custom widgets 536. The user may select a "create widget" option on the user interface 520. The user interface manager 518 may display options for creating the widget. For instance, the user interface manager 518 may provide all available KPIs which can be displayed in a widget on the tab 534. The user can select a commodity to filter KPIs (e.g., selection of electricity may display KPIs which use points corresponding to electricity, selection of production may display KPIs which use points corresponding to production, selection of natural gas may display KPIs which use points corresponding to natural gas, and so forth). The user may then select a KPI for displaying in/on the widget 536.

In some embodiments, the user interface manager 518 may include an authorization engine 540. The authorization engine 540 may be designed or implemented to verify whether a user requesting to display the widget 536 is authorized. The authorization engine 540 may include a list of identification information. The authorization engine 540 may be configured to receive (e.g., from the user interface 520) identification information from a user (such as employee ID number, username and password, etc.). The authorization engine 540 may cross reference the list to determine whether the user has provided proper authentication information. The authorization engine 540 may verify the identity of the user. In some embodiments, the authorization engine 540 may determine whether the user has access to the particular widget 536. If the user has access, the authorization engine 540 may provide an indication to the user interface manager 532 and the user interface manager 532 may render the widget 536 on the user interface.

Figure 6:
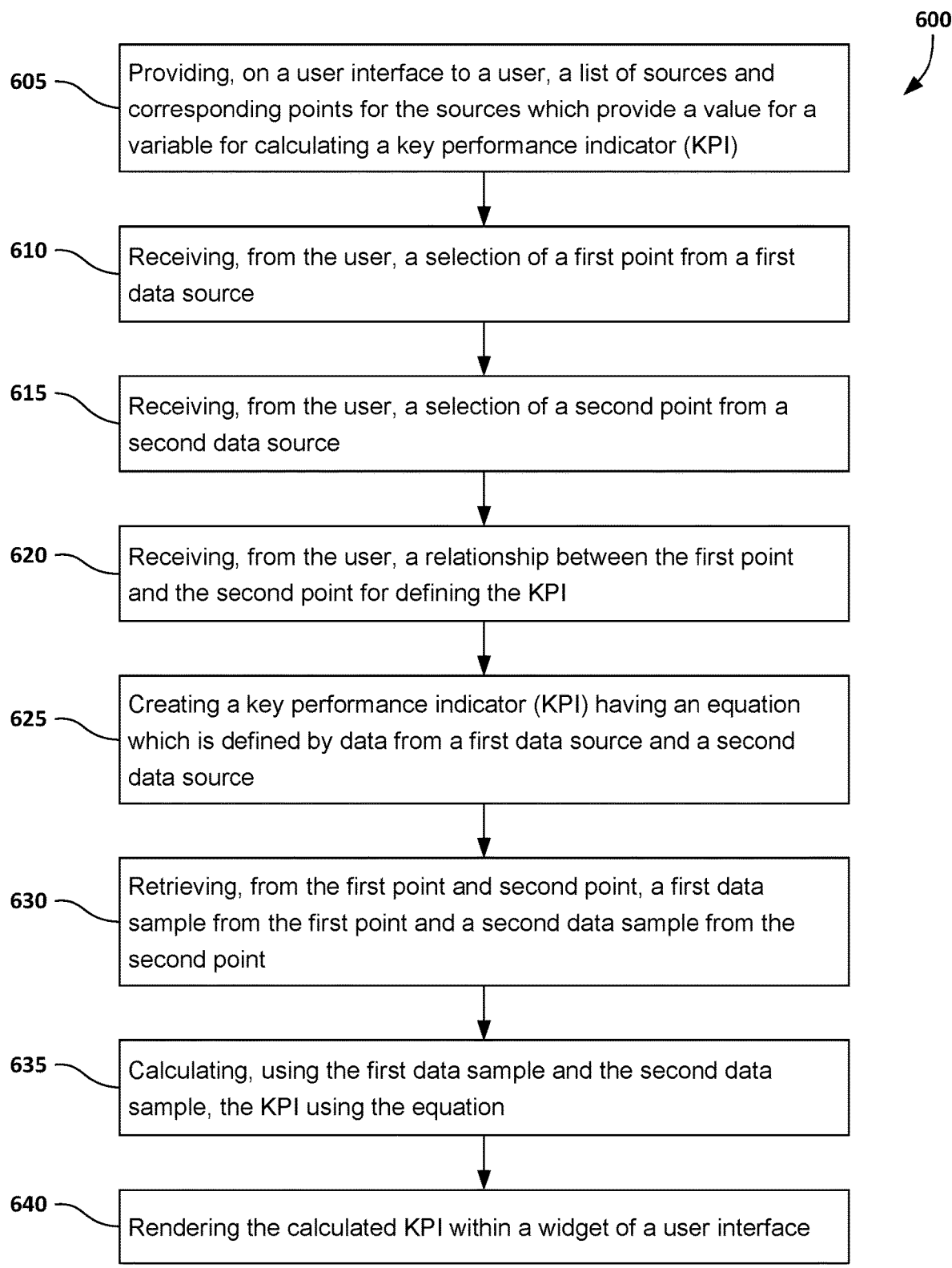
FIG. 6 is a flowchart showing an example method of managing a user interface, according to an exemplary embodiment.

Referring now to FIG. 6, a flowchart showing an example method 600 of managing a user interface 520 is shown, according to an exemplary embodiment. The method 600 may be implemented using the various components described above (e.g., those shown in FIG. 1-FIG. 5).

At step 605, and in some embodiments, the controller 502 may provide, on a user interface 520 to a user, a list of sources and corresponding points for the sources which provide a value for a variable for calculating a key performance indicator (KPI). The controller 502 may provide the list responsive to the user selecting an option to create a custom KPI on the user interface 520. In some embodiments, the controller 502 (e.g., the KPI generator 526) may include the list of sources and points. The points may be or include specific components in the building management system 402, specific cells or data fields in the offline data sources 510, etc. Each point may provide a value for a variable. The variable may be used for calculating a KPI. As new components are added to the system (e.g., additional building components to the BMS 402, for instance), the list may correspondingly be updated.

At step 610, and in some embodiments, the controller 502 may receive, from the user, a selection of a first point from a first data source. The user may provide a selection of the first point to the user interface 520. In some embodiments, the user may select the first point on the list. The list may include drop-down elements corresponding to points, and the user may select the first point from the list of various points. The user interface manager 518 may receive the selection from the user (e.g., as a DOM event). The user interface manager 518 may provide the selection to the KPI generator 526.

At step 615, and in some embodiments, the controller 502 may receive, from the user, a selection of a second point from a second data source. The user may provide a selection of the second point to the user interface 520. In some embodiments, the user may select the second point on the list. The user interface manager 518 may receive the selection from the user (e.g., as a DOM event). The user interface manager 518 may provide the selection to the KPI generator 526.

In some embodiments, the user may select additional points. The user may select additional points to add additional levels and details to the KPI. For instance, the user may generate more nuanced KPIs by adding additional points, as needed.

At step 620, and in some embodiments, the controller 502 may receive, from the user, a relationship between the first point and the second point for defining the KPI. The KPI generator 526 may communicate a prompt to the user interface manager 518 for requesting the user to define the relationship between the first and second point. The KPI generator 526 may communicate the prompt responsive to the user selecting the first and second point. The user interface 518 may control the user interface 520 to request the user provide a relationship between the first and second points. The user may provide the relationship to the user interface 520. For instance, the user may provide one or more operators (e.g., multiplication or division operators, addition or subtraction operators, etc.). The user interface manager 518 may receive the relationship provided by the user. The relationship may be used for defining the KPI.

In some embodiments, the KPI generator 526 may verify one or more aspects of the relationship. For instance, the KPI generator 526 may verify the syntax for the KPI. The KPI generator may determine, based on the syntax, whether the points and corresponding relationship are properly formatted.

At step 625, and in some embodiments, the controller 502 may create the KPI having an equation which is defined by the relationship. The KPI generator 526 of the controller 502 may save the KPI (e.g., as stored KPIs 528). In some embodiments, the KPI generator 526 may receive, from the user via the user interface, corresponding personnel who are able to access the KPI. For instance, the user may indicate that management and engineering team have access to the particular KPI. As another example, he user may indicate that particular people (e.g., personnel within specific groups or teams) have access to the KPI. The KPI generator 526 may store the KPIs for subsequent use.

At step 630, and in some embodiments, the controller 502 may receive, from the first point and the second point a first data sample from the first point and a second data sample from the second point. The first point and second point may communicate, provision, publish, etc. the data samples in real time, at intervals (e.g., every five minutes, 15 minutes, hour, day, etc.). When the first point and second point publish the first and second data samples, the KPI calculator 530 may receive the first and second data samples.

At step 635, and in some embodiments, the controller 502 may calculate, using the first data sample and the second data sample, the KPI using the equation. The KPI calculator 530 may calculate the KPI using the relationship defined by the user (e.g., at step 620) and the first and second data sample (e.g., received at step 630). The KPI calculator 530 may use the relationship defined by the user, and the KPI calculator 530 may substitute the variables with the data samples from the first point and second point.

At step 640, and in some embodiments, the controller 502 may render the calculated KPI within a widget of a user interface. The user interface manager 518 may render the KPI within, for instance, a custom widget which is defined by a user. The user may select an option to create a custom widget on the user interface 520, select the KPI created (e.g., at step 525) from a list of available KPIs (including other custom KPIs, standard KPIs, etc.). When the custom widget is created including the KPI generated at step 525, the custom widget may display the KPI. In some embodiments, the custom widget (including the KPI) may be displayed to users who are properly authorized. For instance, the KPI may be available to a subset of users. An authorization engine 540 may authorize a user (e.g., via employee identification number, username and password, etc.). The KPI may be stored as associated with particular authorized personnel or personnel in specific departments. The authorization engine 540 may authenticate the person who requests viewing the widget, and may determine whether the user is authorized to view the widget (e.g., whether the person is one of the authorized personnel). When authorized, the widget including the KPI may be rendered (e.g., as a dashboard) for viewing.

Figure 7:
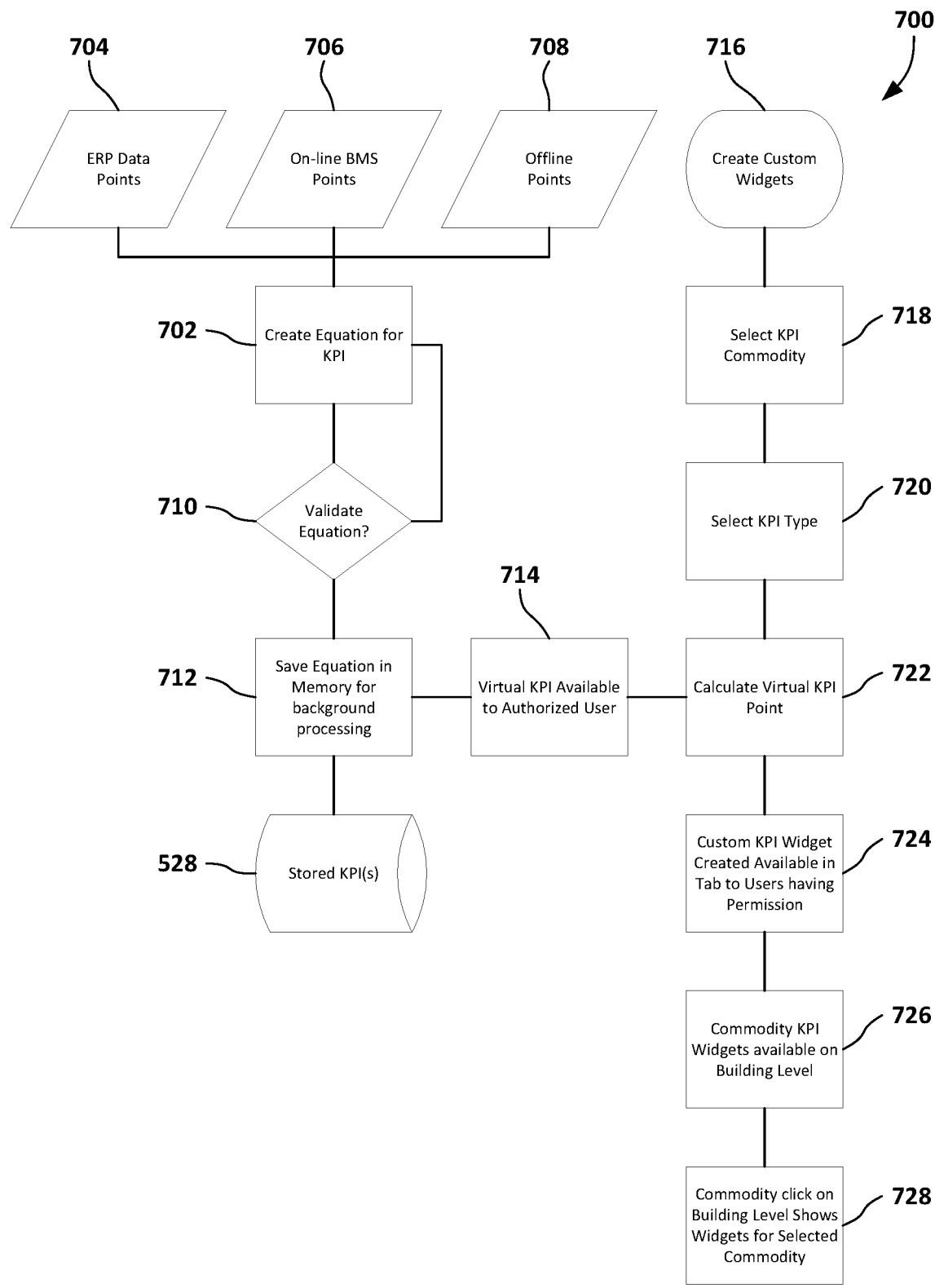
FIG. 7 is an example workflow for generating a customized KPI is shown, according to an exemplary embodiment.

Referring now to FIG. 7, an example workflow 700 for generating a customized KPI is shown, according to an exemplary embodiment. The workflow 700 may be implemented using the various components described above (e.g., those shown in FIG. 1-FIG. 5).

At function block 702, the controller 502 may create an equation for a KPI. The controller 502 may include or access a list of points, which are used for creating the equation (e.g., by a user). The points may be categorized by source. For instance, the controller 502 may include or access a list of ERP data points 704 corresponding to an ERP system, a list of online BMS points 706 corresponding to a BMS 402, and a list of offline points 708 corresponding to offline sources 510. The controller 502 may receive a relationship between selected points which defines the equation.

At function block 710, the controller 502 may validate the equation created at function block 702. The controller 502 may check, verify, or otherwise validate the syntax of the equation, the format of the relationship and/or points, etc. Where the equation is not properly validated, the workflow 700 may proceed back to function block 702, and the equation may be correspondingly modified so that the equation has proper syntax. Where the equation is properly validated, the workflow 700 may proceed to function block 712.

At function block 712, the controller 502 may save the equation in memory for background processing. The KPI may be saved by the KPI manager 516 (e.g., as stored KPIs 528). The KPI may be calculated in the background (e.g., by a KPI calculator 530) as data samples are published by the points.

At function block 714, the controller 502 may make the custom KPI (also referred to herein as a virtual KPI) available to authorized users. In some embodiments, the controller 502 may include an authorization engine 540 which authenticates the user's identity (e.g., via log-in credentials, employee identification information, etc.). The authorization engine 540 may determine which KPIs the user is authorized to access. Hence, the controller 502 may sort, arrange, determine, or otherwise identify KPIs that the user has access to.

At function block 716, the user may select an option (e.g., on the user interface 520) to create a custom widget. The user interface manager 518 may receive the selection. The user interface manager 518 may route the selection to a dashboard engine 532.

At function block 718, the user may select a KPI commodity. The user interface manager 518 may provide a list of KPI commodities which can be included in a widget. In some embodiments, the user interface manager 518 may provide the custom (e.g., virtual) KPI in the list. In some embodiments, the user interface manager 518 may provide a list of KPI commodities which the user is authorized to access (e.g., based on information from the authorization engine 540). Hence, the list of KPI commodities rendered on the user interface 520 by the user interface manager 518 may be less than all the available KPIs—rather, the list may be a subset of KPI commodities which are available to the user. The user may filter by KPI commodities (e.g., selection of electricity may display KPIs which use points corresponding to electricity, selection of production may display KPIs which use points corresponding to production, selection of natural gas may display KPIs which use points corresponding to natural gas, and so forth). The user may then select a particular KPI commodity.

At function block 720, the user may select the KPI type. The user interface manager 518 may be configured to display KPI types (e.g., finance commodity types, engineering commodity types, management commodity types, etc.). Each commodity type may correspond to availability of the KPI to particular users who are authorized to view the commodity. The user may select the KPI type from the list.

At function block 722, the KPI calculator 530 may calculate the virtual KPI point. The KPI calculator 530 may receive data samples from the selected KPI points (e.g., at function block 702). When the data samples are received by the KPI calculator 530, the KPI calculator 530 may calculate the virtual KPI point (e.g., using the equation).

At function block 724, the custom KPI widget which was created is made available in a tab corresponding to particular users who have permission to access the KPI. As described above, the KPI may be available to particular users. The authorization engine 540 may authorize the user and, when the user is properly authorized, the user may be displayed or have access to display authorized tabs including authorized widgets having authorized KPIs.

At function block 726, the commodity KPI widgets are made available on a building level. As described in greater detail below in subsequent sections, particular widgets may be made available in tabs corresponding to particular buildings, particular floors in buildings, etc. The tabs may thus be arranged by the dashboard engine 532 by buildings.

At function block 728, when a user clicks on a particular tab associated with a building (and the user is authorized), the user interface manager 518 may render the widgets in a dashboard interface for the tab.

In addition to the KPIs created for different departments and users, the KPIs generated herein may be used for Building Performance Ranking for an enterprise. The KPIs tagged against different locations may be consolidated onto a static widget which is generated at a facility (or building) level. Once the user has created a widget with the KPI, all the information related to that KPI may become available under a performance ranking indicator widget at a portfolio/facility level. The performance ranking indicator widget may allow a user to select any KPI from the dropdown list. For the selected KPI, the system will check for all the custom widgets created at any level and retrieve all distinct points. All that distinct point information may be displayed under performance ranking indicator widget. The building Performance Ranking allows management to understand the performance of different manufacturing locations on the same KPI, thus helping to evaluate which site is performing best and which is worst. In this manner, sites can be compared and the ones needing attention can be shortlisted.

B. Systems and Methods for Generating Custom Dashboards

In some building management systems, buildings and facilities are typically monitored within a portfolio through custom widgets. Some widgets may be created on the fly using the custom tab (as described above). Typical systems are not able to create custom tabs, or view or visualize widgets under different commodities. For instance, for a given widget, the widget is only displayed under a single commodity. Rather, according to the embodiments described herein, some widgets may be displayed under different categories like production, cost, or different commodities like electricity, water, heat etc.

Many enterprises may have a requirement to monitor information and data under different sections/department. For monitoring such information according to these requirements, tabs may be customized to display specific KPIs as per various sections/departments within the enterprise. For instance, a custom finance tab may be created to display cost-related widgets, a custom production tab may display production related widgets, etc. All tabs may be secured (similar to described above) such that authorized users may view the widgets which they are authorized to view and may, in some embodiments, create additional widgets as needed.

According to the aspects described herein, an administrative user may create individual tabs arranged for a dashboard for each section, department, etc. The administrative user may create various widgets as part of the dashboard for the specific section, department, etc. Each tab may be assigned to different user roles with view/edit permissions. According to the embodiments described herein, a given user may only be permitted to view dashboard tabs which are related to him only. For instance, a user related to production department will see only those widgets which are under production tab. At the same time, a user group can individually monitor their own usage of electricity, for instance.

The embodiments described herein provides a tool for customizing KPIs according to enterprise needs. Various KPI groups/tabs may be arranged and ordered as needed, thus providing the flexibility and agility to design tabs and KPIs as per customer/market needs.

Figure 8:
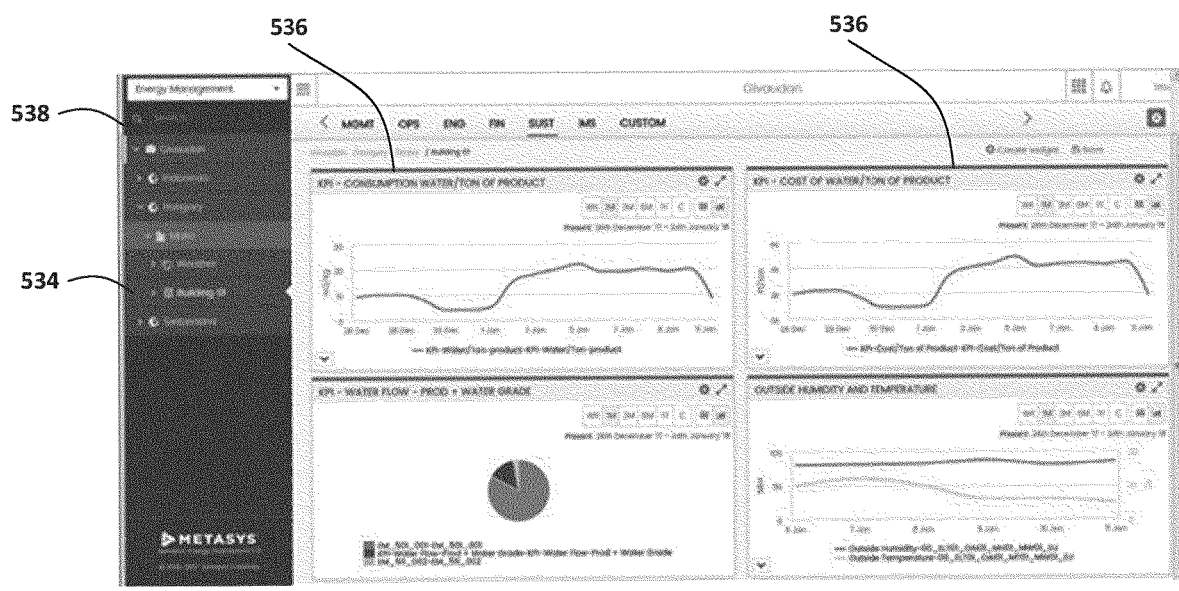
FIG. 8 is a user interface showing an example tab for a dashboard which is customized to a particular department, according to an exemplary embodiment.

Referring now to FIG. 5 and FIG. 8, the controller 502 may be configured to generate a dashboard for particular users. Specifically, FIG. 8 shows a user interface 520 showing an example tab for a dashboard which is customized to a particular department, according to an exemplary embodiment. As can be seen in FIG. 8, the dashboard may include four widgets 536 which correspond to various commodities.

The user interface manager 518 may be configured to receive a selection from a user, such as an administrative user, for creating a customized dashboard. The dashboard may be specific to a particular department, group, etc. within the enterprise. The dashboard engine 532 may create, build, assemble, etc. the dashboard based on the selection from the user. The user may provide authorization to specific users who may be able to view, edit, etc. the dashboard.

The dashboard engine 532 may arrange, group, etc. widgets according to business needs or requirements, according to departments, etc. The user may provide inputs to organize the widgets 536.

In some embodiments, the user may create a new tab. The user may select a new tab option (e.g., a plus [+] symbol or icon) on the user interface. The user interface manager 518 may receive the user selection (e.g., as a DOM event). The user interface manager 518 may then provide a prompt (e.g., a text box) for entering a name for the tab. The user may enter a name for the tab according to various requirements. Example of such tabs include, for instance, a compressed air tab, a production tab, a waste water tab, an electricity tab, etc. Each of these tabs may include corresponding KPIs and widgets, which are thus grouped into different groups, sections, departments, commodities, etc. Hence, similar widgets may be grouped together for ease of use and user friendliness. The user may add widgets to the tab by providing corresponding inputs to the user interface 520. Such inputs may be communicated to the dashboard engine 534, and the dashboard engine 534 may correspondingly add, replace, modify, etc. the widgets on a corresponding tab.

Once a tab is created, an administrator user may assign the tabs to specific users. The administrator user may provide various inputs to the user interface 520, which are communicated to the authorization engine 540, to indicate which users are authorized to view a particular tab. The administrator user may also add view/edit permissions for the widgets, tabs, etc.

The authentication engine 540 may authenticate a given user (e.g., by the user providing log-in credentials, employee identification information, etc.). When the use is authenticated, the user may rename, rearrange tabs, delete tabs, etc. The user select and drag tabs to desired locations, select the name of a tab to rename the tab, etc. Hence, such tabs may be dynamically moved, edited, etc. according to needs. The embodiments described herein may increase user friendliness. Additionally, the embodiments described herein may provide audience-based information.

Figure 9:
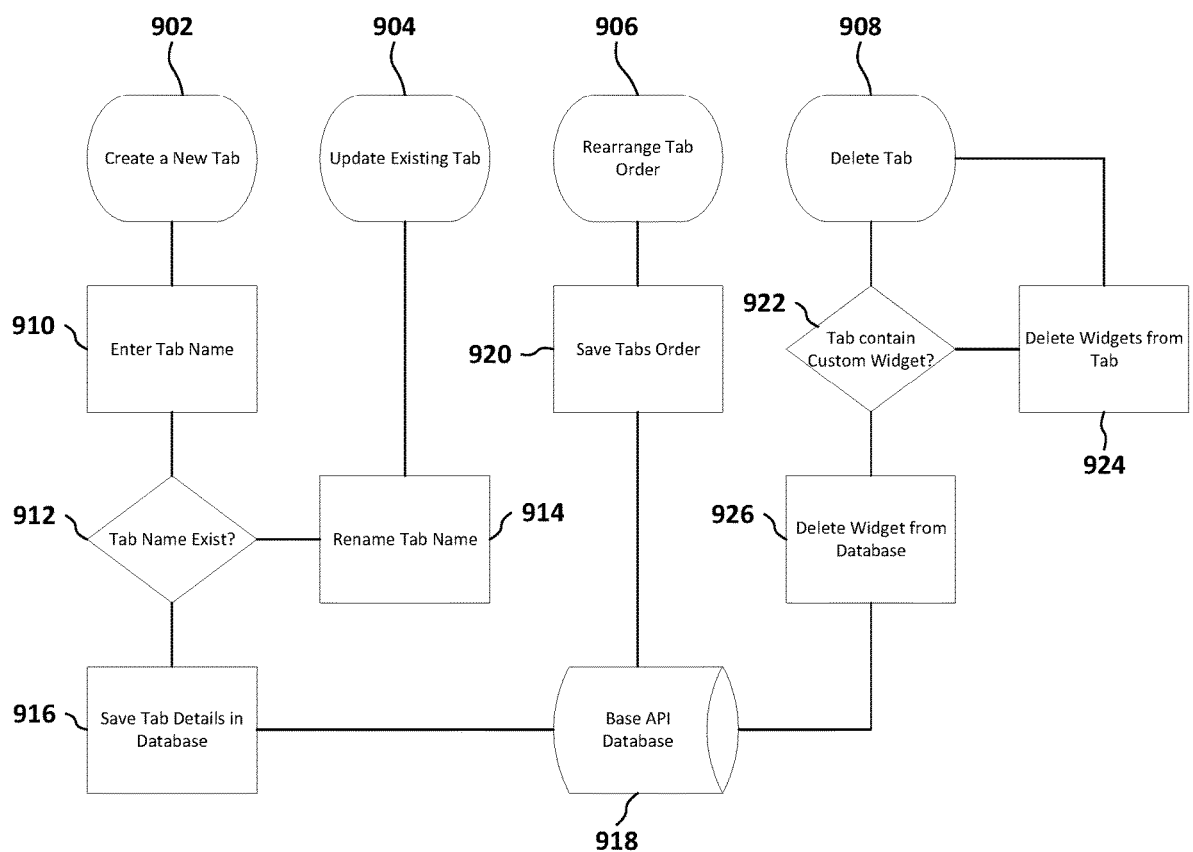
FIG. 9 is an example workflow for generating a customized tab, according to an exemplary embodiment.

Referring now to FIG. 9, an example workflow 900 for generating a customized tab is shown, according to an exemplary embodiment. The workflow 900 may be implemented using the various components described above (e.g., those shown in FIG. 1-FIG. 5).

The workflow 900 may begin when a user creates a new tab (function block 902), updates an existing tab (function block 904), rearranges tab order (function block 906), or deletes a tab (function block 908).

In some embodiments, the user may select a new tab option on the user interface 520. The user interface manager 518 may detect the user's input on the user interface 520 (e.g., by registering, detecting, or otherwise identifying the corresponding DOM event). The workflow 900 may proceed to function block 910.

At function block 910, the user may be prompted to enter a tab name. The user interface manager 518 may control the user interface 520 to provide the prompt (e.g., a text box) for entering a tab name. The user may provide a tab name.

At function block 912, the user interface manager 518 may determine whether the tab name provided by the user (e.g., at function block 910) currently exists. Where the tab name currently exists, the user interface manager 518 may prompt the user to rename the tab (at function block 914). The user interface manager 518 may then verify that the renamed tab doesn't exist.

At function block 916, the user interface manager 518 may save the tab details in a database 918 (e.g., managed by the dashboard engine 534). In some embodiments, the user may add corresponding details which are saved with the new tab. For instance, the user may provide inputs of widgets to provide on the tab, access rights corresponding to authorized users or groups of users, tab location, etc. The user may provide such information to the user interface 520, which is received by the user interface manager 518. The tab 534 saved in the database 918 may be updated by the dashboard engine 532.

Similarly, where a user updates an existing tab (function block 904), such as renaming a tab (at function block 914), the tabs name may be verified to determine whether the name currently exists (function block 912). Where the tabs new name doesn't exist, the dashboard engine 532 may update the database 918 to revise the name of the tab.

Where a user rearranges the tab order (function block 906), the dashboard engine 532 may save the tab order as revised. The dashboard engine 532 may save the tab order in the database 918 (function block 920). Correspondingly, when a user relaunches the database, the tab order on the dashboard may be revised according to the new tab order.

Where a user deletes at tab (function block 908), the user interface manager 518 may determine whether the tab contains any widgets (function block 922). At function block 922, where the tab contains widgets, the dashboard engine 532 may delete widgets from the tab (function block 924). Once all widgets are deleted from the tab, the tab may be deleted from the database 918 (function block 926).

C. Systems and Methods for Modifying a Navigation Pane

In many systems, varying degrees of tabs may be displayed on a navigation pane. For instance, a navigation pane for a building management system may include spaces, meters, equipment and points. Items from this navigation pane may be used for various purposes. Hence, the navigation pane may be the main entry point for various charts and graphics for the user. Space hierarchy is not necessarily the same for each enterprise. As number of levels differ from enterprise to enterprise and building to building, making the navigation pane "infinite" helps to satisfy all needs of space/meter/equipment hierarchy.

The user interface design of space navigation supports navigation to the n-th level of space. Thus, users may navigate through the complete space/meter/equipment hierarchy and get the graph/data corresponding to such components. As the user interface design supports navigation to the n-th level of space/meter/equipment, such embodiments may assist a user in understanding the complete structure of the BEMS system. Lack of n-th level of structure support in the navigation tree may mislead the user about the BEMS structure.

According to the aspects described herein, any kind of BEMS structure may be supported by the navigation pane. As navigation pane is flexible, a user has free hand and may create the BEM structure on the navigation pane to match the structure on the site. Since the navigation pane can mimic the site structure, it helps a user locate the space/meter/equipment on the site using the disclosed systems and methods. As the n-th level of structure is supported, a user can navigate to the required space/meter/equipment and required chart/data. Additionally, as n-th level of structure is supported, a user can use a draggable feature of the navigation pane and use it for analysis.

Figure 10:
FIG. 10-FIG. 11 are example user interfaces showing an automatic modification of a navigation pane, according to an exemplary embodiment.
Figure 11:
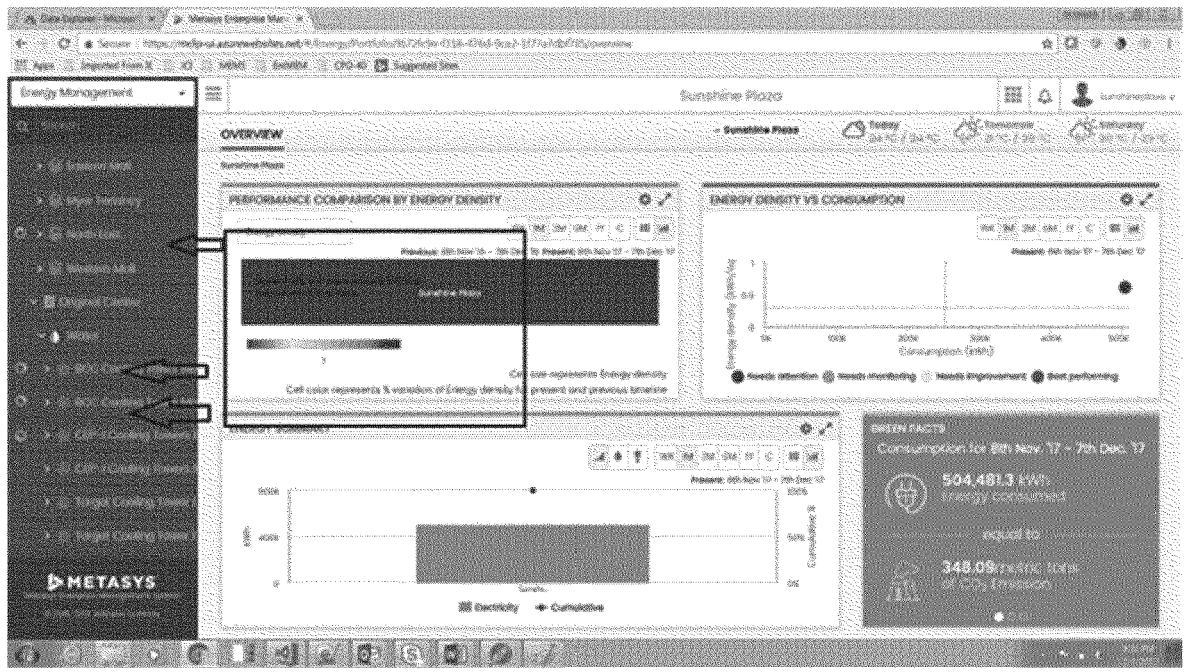

Referring now to FIG. 5 and FIG. 10-11, in some embodiments, the user interface manager 518 may be configured to modify, adapt, or dynamically adjust the navigation pane. Specifically, FIG. 10-FIG. 11 show example user interfaces showing an automatic modification of a navigation pane, according to an exemplary embodiment. The dashboard engine 532 may provide for n-th level structure of the navigation pane 538. The n-th level structure may be based on locations associated with an enterprise. The system 500 is shown to include enterprise location data 542. The enterprise location data 542 may be or include, for instance, locations associated with an enterprise (e.g., campuses), buildings on the campuses, and maps of the respective buildings including BMS components in the buildings. The dashboard engine 532 may access the enterprise location data 542 for building the n-th level structure. As the enterprise changes, builds or adds additions to current buildings, etc., the enterprise location data 542 may correspondingly be updated (along with the n-th level structure). Thus, the n-th level structure may be dynamically adapted according to changes to the enterprise.

Users may navigate to specific components in a given building using the navigation pane 538. The navigation pane 538 may thus be structured to substantially mimic the building structure. In some embodiments, the navigation pane 538 may display (e.g., as shown in FIG. 10) the first and second (e.g., primary and secondary) tabs. When a user selects one of the tabs, the navigation pane 538 may be expanded to display the next level. When a user selects a tab in the next level, the navigation pane 538 may further be expanded to display the next level, and so forth. Hence, the primary tab (corresponding to a location for an enterprise) may include a plurality of secondary tabs (corresponding to buildings at the location) nested therein, the secondary tabs may include a plurality of tertiary tabs (corresponding to levels of a building) nested therein, the tertiary tabs may include a plurality of quaternary tabs (corresponding to zones within a level) nested therein, and the quarternary tabs may include a plurality of quinary tabs (corresponding to rooms within a zone) nested therein, and so forth.

As a user selects a tab on the navigation pane rendered within the user interface 520, the user interface 518 may detect the DOM event corresponding to the selection. The dashboard engine 532 may dynamically fetch data for tabs at the next level of the hierarchy. The dashboard engine 532 may append the next level to the existing structure, thus creating a nth level hierarchy.

In some embodiments, the dashboard engine 532 may modify one or more aspects of the navigation pane 538 as the dashboard engine 532 fetches new levels of the hierarchy. For instance, the dashboard engine 532 may be designed or implemented to modify the width of the navigation pane 538, the viewing region of the navigation pane 538, etc. responsive to receiving a selection of a tab.

The dashboard engine 532 may be configured to modify a width of the navigation pane 538. In some embodiments, the dashboard engine 532 may be configured to determine or identify the current width of the navigation pane 538. Such information may be included in the DOM objects corresponding to the navigation pane 538 sent by the user interface manager 518 to the client device 524. The dashboard engine 534 may be configured to determine the maximum string length contained in the navigation pane 538. The dashboard engine 534 may be configured to determine the width of each (or the largest) string contained in the next level to be displayed on the navigation pane. Where the width of the largest string is greater than the maximum string length corresponding to the current width of the navigation pane 538, the dashboard engine 534 may increase the width of the navigation pane 538. As such, the string may not be truncated and the full text of each of the tabs in the next level may be visible.

The dashboard engine 532 may be configured to modify the viewing region of the navigation pane 538. The dashboard engine 532 may identify or determine the number of tabs contained in the n+1 level corresponding to the selected tab (e.g., to be displayed) on the navigation pane 538. The dashboard engine 532 may determine the current viewing region (e.g., based on DOM objects sent by the user interface manager 518 to the client device). The dashboard engine 532 may determine, based on the current viewing region, whether each of the tabs in the n+1 level will be viewable in the current viewing region. The dashboard engine 532 may automatically move the viewing region such that the tabs halfway (or approximately halfway) in the n+1 level are in the center of the viewing region. The dashboard engine 532 move the viewing region to the left-right, up-down, etc. so that the tabs in the n+1 level are viewable when rendered on the display 522.

Figure 12:
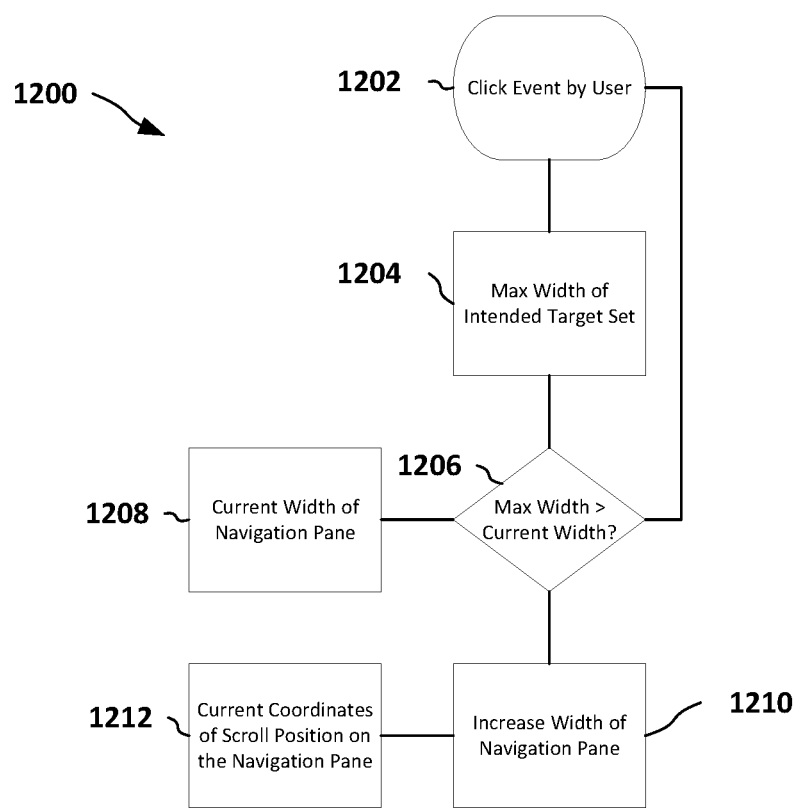
FIG. 12 is an example workflow for modifying a navigation pane, according to an exemplary embodiment.

Referring now to FIG. 12, an example workflow 1200 for generating a customized tab is shown, according to an exemplary embodiment. The workflow 1200 may be implemented using the various components described above (e.g., those shown in FIG. 1-FIG. 5).

At function block 1202, the user interface manager 518 may detect a click event by a user. The user interface manager 518 may receive a DOM event from the user interface 520 which indicates the user clicked on a tab 534 on the navigation pane 538.

At function block 1204, the dashboard engine 532 may determine the maximum width of the intended target set (e.g., the tabs contained in the n+1 level of the hierarchy). The dashboard engine 532 may identify the largest string length of the tabs in the n+1 level. The dashboard engine 532 may identify those tabs in the next level on a dynamic basis (e.g., responsive to a user selection).

At function block 1206, the dashboard engine 532 may determine whether the maximum width (e.g., determined at function bock 1204) exceeds the current width of the navigation pane 538. The dashboard engine 532 may identify the current width of the navigation pane 538 (e.g., at function block 1208) based on a DOM object communicated from the user interface manager 518 to the client device. Where the maximum width does not exceed the current width of the navigation pane 538, the workflow 1200 may proceed back to function block 1202.

Where the maximum width exceeds the current width, the dashboard engine 532 may modify the navigation pane 538 (function block 1210). In some embodiments, the dashboard engine 532 may modify the width of the navigation pane 538 (e.g., increase the width of the navigation pane 538). In some embodiments, the dashboard engine 532 may modify a viewing region for the navigation pane 538. The dashboard engine 532 may receive current coordinates of the scroll position on the navigation pane 538 (e.g., at function block 1212). The dashboard engine 532 may receive the current coordinates from the user interface manager 518 (e.g., as a DOM object). The dashboard engine 532 may determine whether the current viewing region (based on the current coordinates of the scroll position of the navigation pane 538) will fit the n+1 level of tabs. The dashboard engine 532 may adjust the scroll position to modify the viewing region such that the navigation pane 538 is centered (or substantially centered) with respect to the n+1 level of tabs.

According to the embodiments described herein, text may be less likely to be truncated. The embodiments described herein may provide for an infinite navigation pane, which can be used to match with building structures. Such embodiments may increase user friendliness and may be more visually appealing.

D. A Configurable Kiosk for Rendering a User Interface

Some businesses may include a kiosk. A kiosk typically involves a public facing tool that enables building owners to showcase their properties' energy conservation and sustainability measures.

By hosting a kiosk on a large touch screen in a facility's lobby or common area, an enterprise can introduce visitors to a building's sophisticated operating systems, providing the public with an interactive and dynamic presentation of the enterprises' most innovative green building features. Since the kiosk is public facing, the kiosk may capture attention and motivate interaction, and both of those goals may rely on conceptualizing and constructing the right design.

In order to capture attention of the visitors, the dashboard of the kiosk may provide an eye-catching enclosure with clear messaging while offering users an effective and efficient experience. Various aspects of the dashboard, such as size and shape to colors, screen positioning and height, the physical form and appearance may be modified to attract and promote user interaction.

Referring now to FIG. 5, in some embodiments, the dashboard engine 532 may be designed or implemented to provide a design studio interface. The dashboard engine 532 may be configured to receive inputs (e.g., on the user interface 520) from a user, such as an administrator user, for customizing the dashboard to fit needs of a particular enterprise. The dashboard engine 532 may provide for modifying the look and feel of the dashboard displayed to customers on the kiosk, and to modify various aesthetic appearances of the dashboard.

The dashboard engine 532 may be configured to modify the dashboard to generate an energy dashboard. The energy dashboard may render various types of energy statistics, such as electricity, oil, gas, coal, diesel, etc. usage. The administrator user may provide various inputs to the user interface 520 for modifying the dashboard displayed to customers (e.g., on the kiosk).

The dashboard modified by the dashboard engine 532 may be configured to display details, statistics, etc. for all (or a subset) of the commodity meters installed on a facility or building. Given that, on a building-by-building basis (even for the same enterprise), each facility or building is different and may correspondingly use different commodities, the administrator user may provide inputs to modify the dashboard for each building in an enterprise according to the arrangements of a particular building. The dashboard engine 532 may be configured to present various hide/show options corresponding to commodities at a building. Where the user selects a button for showing data corresponding to a particular commodity, the dashboard engine 532 may control the user interface to render a pop-up which lists of all the tabs/widgets including the commodities that are available for the space nodes. The user may select the checkboxes to hide/show corresponding tabs/widgets. For instance, where an enterprise wants to show details of electricity and water commodities on the kiosk, the user may select (e.g., on the hide/show options) the electricity and water commodities desired to be displayed. Such embodiments provide for the dashboard including only the tabs the enterprise chooses to display.

The dashboard engine 532 may be configured to store various images, text, background colors for the dashboard. For instance, an administrator user may provide various images, text, background colors, links, etc., according to particular customer domains. As one example, a kiosk at a hospital may provide information on medical conditions, surgical options, health news, support groups, healthy living, and a health directory. As another example, a kiosk at a retail company can provide detailed information about the products and services offered using background image. As still another example, a kiosk at a sporting goods company can show a background image and color which showcases the company's product and usability. Since kiosks are easily accessed by customers on an as-needed basis, customers may find it convenient to visit a kiosk for inquiries such as product pricing, availability, and feature comparison. Each of these kiosks may also render information pertaining to commodities used at the particular facilities on an as-needed basis.

The following example is not intended to be limiting. Rather, the following example is for illustrative purposes. An enterprise may have electricity, gas, diesel and water meters at a particular facility. An administrative user may select to display only electricity and water details to the public. The administrative user may provide prompts to the user interface 520 which are received by the dashboard engine 532. The prompts may indicate instructions for assembling the dashboard, and the prompts may indicate that only electricity and eliminates lead time in constructing custom kiosks.

In some embodiments, a kiosk may be configured according to particular floors (e.g., which may have different commodity meters). Hence, the kiosk may be configurable to each specific building and each specific floor. Such embodiments may increase consumer confidence that the particular enterprise is utilizing the latest technologies to improve the consumer experience. Such factors may promote loyalty among consumers as they can enjoy a more enhanced buying/service experience through the use of these kiosks.

According to the embodiments described herein, the customized dashboard may provide for a reduction in time and effort spent in designing Kiosk Specific to a customer. The customized dashboard may reduce the gap which typically results in customer training on using kiosks (since the kiosks are relatively standardized in operation, but customized in information provided to the customers). The customized dashboard may be easy to use and reliable. The customized dashboard may provide an aesthetic and intuitive customer interface. The customized dashboard may provide for easy configuration of the dashboard (e.g., to hide and display various commodities as needed).

The dashboard engine 532 may be configured to modify various aspects of the dashboard provided on the kiosk. The dashboard engine 532 may be configured to permit a user to apply a background image to all pages or just select pages. The dashboard engine 532 may be configured to present a color picker for selecting various colors for the dashboard. The color picker may include a selection palette, a text box for entering RGB or HEX values, etc. The user may select colors, save colors to a saved palette (e.g., my colors), control the opacity of the colors or background images, etc. The dashboard engine 532 may provide for addition of customer logos (e.g., at the top right of the dashboard and on a map section). The dashboard engine 532 may provide for a list of font characteristics such that the administrative user can modify the font, font style, color, effects, etc. The dashboard engine 532 may limit font size and character limitations for each text field, which may be noted to the user, to maintain user friendliness.

The dashboard engine 532 may communicate a preview to the client device for displaying. The administrator user may modify the dashboard according to the preview. In some embodiments, the dashboard engine 532 may provide the administrator user the option to hide/display the tabs as per the customer's choice. Additionally, the user may have the option to enable/disable auto-play of the different pages and the dashboard engine 532 may receive an auto-scroll interval—which may be defined by the user, preset, etc. In some embodiments, the user may provide a scroll interval timing on a slide to slide basis and within the space tree. For instance, the dashboard engine 532 may provide a user the option to modify the time intervals for scrolling from one tab to another, to scroll a Twitter feed interval, a time resolution interval for all commodities tabs and carbon emissions tabs, from one space to another in the space tree, between green tips slides, weather details, etc. In some embodiments, the scroll may be auto-initiated (e.g., responsive to the kiosk detecting a customer present at the kiosk), manually initiated, initiated at various intervals, looped, etc.

The dashboard engine 532 may provide the administrator user the option to select predefined categories for equivalency. For instance, the administrator user may select a number of equivalent widgets for a particular commodity. The administrator user may select an option to hide/show this section for each commodity tab. If user enables this section, at least three equivalent widgets may be shown on a particular commodity tab (so the dashboard is filled out). The dashboard engine 532 may provide the administrator user the option to enable/disable auto-scroll within a space tree with a particular timing. For instance, the administrator user may customize the kiosk to scroll only within a particular space. For instance, an enterprise may include three buildings, but the user may select the first and second buildings for scrolling. The dashboard engine 532 may control the dashboard to scroll the slides for the first and second buildings.

The dashboard engine 532 may provide for capabilities to add videos (e.g., from YouTube or other video source). The user may be provided (e.g., by the dashboard engine 532) a text box for adding a link to a particular video. The user may provide the link within the text box. Additionally, the user may provide an explanation of the context for the video. The user may select options to play the video once, on a loop, delay playing, etc.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of managing a graphical user interface, the method comprising:
   providing, on a user interface to a first user, a list of sources and corresponding points for the sources which provide a value for a variable for calculating a key performance indicator (KPI);
   receiving, from the first user, a selection of a first point from a first data source;
   receiving, from the first user, a selection of a second point from a second data source different from the first data source;
   receiving, from the first user, a relationship between the first point and the second point for defining the KPI;
   generating an equation based on the relationship between the first point and the second point received from the first user;
   creating the KPI using the equation, the KPI being assigned to a tab including a plurality of department-specific KPIs which are accessible by users of the department;
   authenticating a second user as being a member of the department permitted to access the tab;
   receiving, by the second user, a selection of the tab including the department-specific KPIs and the KPI created using the equation; and
   rendering, responsive to the second user being authorized to view the tab based on authenticating the second user as being a member of the department, the plurality of department-specific KPIs including the KPI created using the equation within respective widgets of a dashboard of the user interface.

2. The method of claim 1, wherein the first data source comprises an online building management system and the second data source comprises an offline data source.

3. The method of claim 2, wherein the offline data source comprises one of an offline data source manually updated by a user or an offline data source integrated with an enterprise resource planning system.

4. The method of claim 1, wherein creating the KPI using the equation comprises:
   identifying, based on administrator defined settings, the department associated with the KPI; and
   rendering the KPI within the respective widget of the dashboard for the department associated with the KPI according to the administrator-defined settings.

5. The method of claim 1, further comprising:
   receiving, from the first user, a modification of the dashboard including at least one of:
      renaming the tab;
      rearranging a location of the tab within the dashboard; or
      rearranging a location of the widget within the user interface for the tab; and
   modifying the dashboard in accordance with the received modification from the user.

6. The method of claim 1, wherein the dashboard includes a navigation pane including a plurality of nested tabs including a primary tab and a plurality of secondary tabs, each tab within the nest having a hierarchy; and wherein the method further comprises:
   receiving, from the second user viewing the dashboard, a selection of the primary tab within the navigation pane;
   expanding a list nested within the primary tab, the list including the plurality of secondary tabs; and
   modifying the navigation pane in accordance with the plurality of secondary tabs contained in the list.

7. The method of claim 6, wherein modifying the navigation pane comprises at least one of:
   modifying a width of the navigation pane based on a length of text for at least one of the plurality of secondary tabs; or
   modifying a viewing region of the navigation pane based on a number of the plurality of secondary tabs contained in the list.

8. The method of claim 6, wherein the plurality of nested tabs comprises:
   the primary tab, which is associated with a location of an enterprise;
   the plurality of secondary tabs nested within the primary tab, which are associated with buildings at the location;
   a plurality of tertiary tabs nested within one of the plurality of secondary tabs, which are associated with levels of a building;
   a plurality of quaternary tabs nested within one of the plurality of tertiary tabs, which are associated with zones within a level; and
   a plurality of quinary tabs nested within one of the quaternary tabs, which are associated with rooms within a zone.

9. The method of claim 1, wherein the dashboard is rendered on a kiosk, the kiosk having a customizable user interface.

10. A system of managing a graphical user interface, the system comprising:
   a plurality of data sources having corresponding points which provide a value for a variable for calculating a key performance indicator (KPI), the plurality of data sources including:
      a first data source; and
      a second data source;
   a hardware controller communicably coupled to the first data source, the second data source, the hardware controller configured to:
      provide, on a user interface to a first user, a list of a plurality of data sources and corresponding points for the data sources which provide a value for a variable for calculating a key performance indicator (KPI);
      receive, from the first user, a selection of a first point from a first data source of the plurality of data sources;
      receive, from the first user, a selection of a second point from a second data source different from the first data source of the plurality of data sources;
      receive, from the first user, a relationship between the first point and the second point for defining the KPI;
      generate an equation based on the relationship between the first point from the first data source and the second point from the second data source, wherein the equation is applied to data samples of the first data point and the second data point for computing values for the KPI;

create a KPI using the equation, the KPI being assigned to a tab including a plurality of department-specific KPIs which are accessible by users of the department;

authenticate a second user as being a member of the department permitted to access the tab;

receive, by the second user, a selection of the tab including the department-specific KPIs and the KPI created using the equation; and render, responsive to the second user being authorized to view the tab based on authenticating the second user as being a member of the department, the plurality of department-specific KPIs including the KPI created using the equation within respective widgets of a dashboard of the user interface.

11. The system of claim 10, wherein the first data source comprises an online building management system and the second data source comprises an offline data source.

12. The system of claim 11, wherein the offline data source comprises one of an offline data source manually updated by a user or an offline data source integrated with an enterprise resource planning system.

13. The system of claim 10, wherein creating the KPI using the equation comprises:

identify, administrator defined settings, the department associated with the KPI; and render the KPI within the respective widget of the dashboard for the department associated with the KPI according to the administrator-defined settings.

14. The system of claim 10, wherein the hardware controller is further configured to:

authenticate the second user as being associated with the department prior to displaying the dashboard to the second user;

receive, from the authenticated second user, a modification of the dashboard including at least one of:
 renaming the tab;
 rearranging a location of the tab within the dashboard; or
 rearranging a location of the widget within the user interface for the tab; and modify the dashboard in accordance with the received modification from the authenticated second user.

15. The system of claim 10, wherein the dashboard includes a navigation pane including a plurality of nested tabs including a primary tab and a plurality of secondary tabs, each tab within the nest having a hierarchy; and wherein the hardware controller is further configured to:

receive, from the second user viewing the dashboard, a selection of the primary tab within the navigation pane;

expand a list nested within the primary tab, the list including the plurality of secondary tabs; and modify the navigation pane in accordance with the plurality of secondary tabs contained in the list.

16. The system of claim 15, wherein modify the navigation pane comprises at least one of:

modify a width of the navigation pane based on a length of text for at least one of the plurality of secondary tabs; or modify a viewing region of the navigation pane based on a number of the plurality of secondary tabs contained in the list.

17. The system of claim 15, wherein the plurality of nested tabs comprises:

the primary tab, which is associated with a location of an enterprise;

the plurality of secondary tabs nested within the primary tab, which are associated with buildings at the location;

a plurality of tertiary tabs nested within one of the plurality of secondary tabs, which are associated with levels of a building;

a plurality of quaternary tabs nested within one of the plurality of tertiary tabs, which are associated with zones within a level; and a plurality of quinary tabs nested within one of the quaternary tabs, which are associated with rooms within a zone.

18. The system of claim 10, further comprising:

a kiosk associated with an enterprise, the kiosk having a customizable user interface according to requirements of the enterprise, and wherein the plurality of department-specific KPIs including the KPI created using the equation are rendered within the respective widgets of the dashboard of the customizable user interface of the kiosk.

19. A hardware controller for managing a graphical user interface, the hardware controller configured to execute instructions, the instructions comprising:

provide, on a user interface to a first user, a list of sources and corresponding points for the sources which provide a value for a variable for calculating a key performance indicator (KPI);

receive, from the first user, a selection of a first point from a first data source;

receive, from the first user, a selection of a second point from a second data source different from the first data source;

receive, from the first user, a relationship between the first point and the second point for defining the KPI;

generate an equation based on the relationship between the first point and the second point received from the first user;

create a KPI using the equation, the KPI being assigned to a tab including a plurality of department-specific KPIs which are accessible by users of the department;

authenticate a second user as being a member of the department permitted to access the tab;

receive, by the second user, a selection of the tab including the department-specific KPIs and the KPI created using the equation; and render, responsive to the second user being authorized to view the tab based on authenticating the second user as being a member of the department, the plurality of department-specific KPIs including the KPI created using the equation within respective widgets of a dashboard of the user interface.

* * * * *